Jan. 9, 1923.
J. S. DUNCAN ET AL.
AUTOMATIC RELEASING DEVICE.
FILED FEB. 9, 1921.
1,441,491.
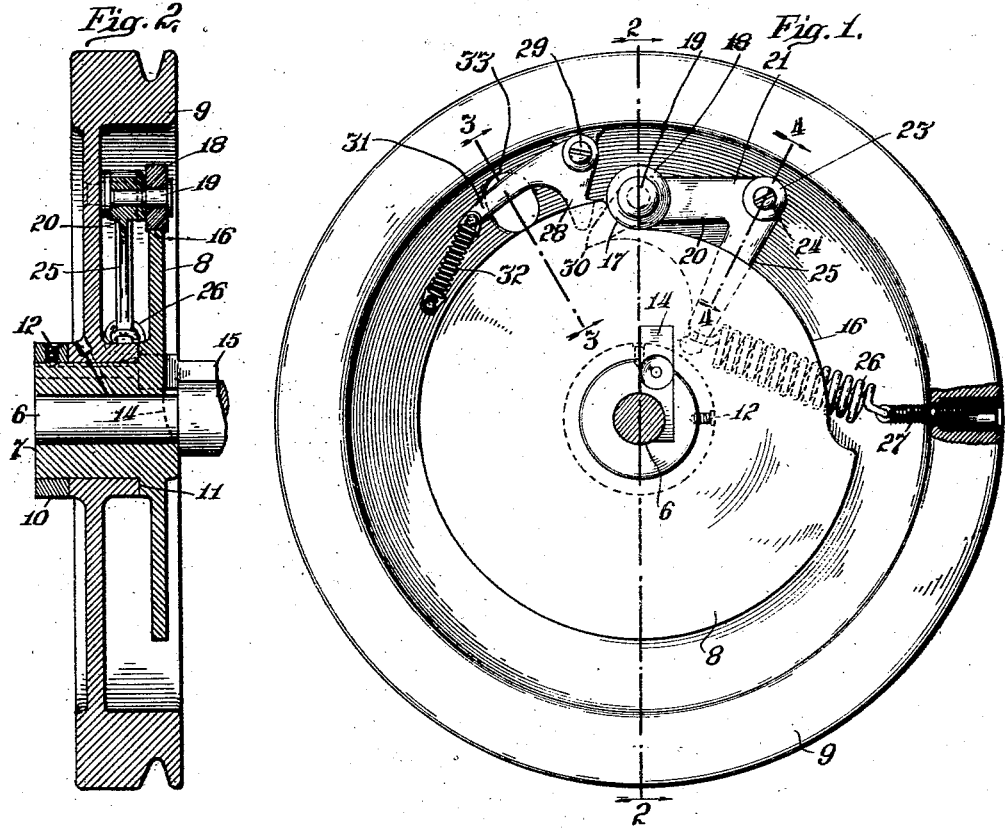
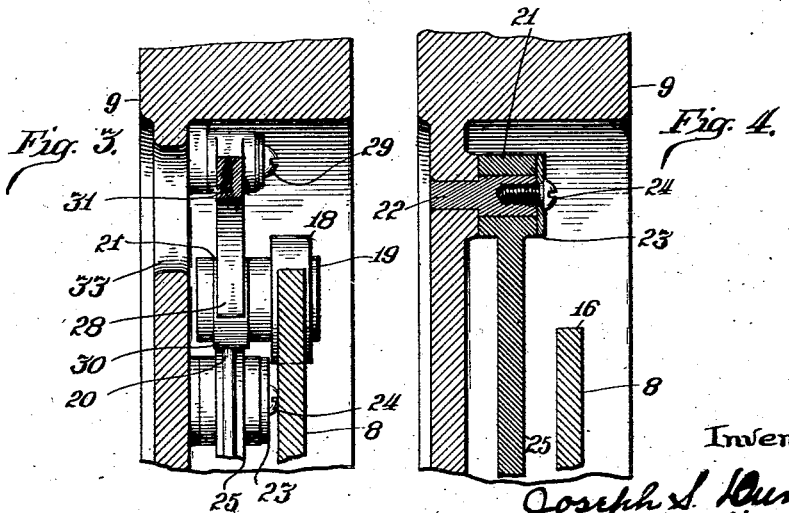
Inventors
Joseph S. Duncan
Henry E. Hubbard
W. F. Bell
Attorney

Patented Jan. 9, 1923.

1,441,491

UNITED STATES PATENT OFFICE.

JOSEPH S. DUNCAN AND HENRY E. HUBBARD, OF CHICAGO, ILLINOIS, ASSIGNORS TO ADDRESSOGRAPH COMPANY, OF CHICAGO, ILLINOIS, A CORPORATION OF ILLINOIS.

AUTOMATIC RELEASING DEVICE.

Application filed February 9, 1921. Serial No. 443,609.

*To all whom it may concern:*

Be it known that we, JOSEPH S. DUNCAN and HENRY E. HUBBARD, citizens of the United States, residing at Chicago, in the county of Cook and State of Illinois, have invented certain new and useful Improvements in Automatic Releasing Devices, of which the following is a specification.

This invention relates to mechanisms for the transmission of power but more particularly to automatic releasing devices for the same and has for its primary object to provide a simple and efficient driving element which will effectually operate the driven element under all normal loads but will automatically release such driven element when abnormal resistance is encountered.

Further objects are to provide means for retaining the driving element out of operative engagement with the driven element after such driven element has been automatically released until such retaining means is disengaged by the operator, and to provide means for readily adjusting the automatic releasing device. Our invention is capable of application to practically any mechanism for the transmission of power having separable driving and driven elements.

The many other objects and advantages of our invention will be apparent as it is better understood by reference to the following specification when read in connection with the accompanying drawing illustrating a selected embodiment thereof, in which—

Fig. 1 is a front elevation of the invention,

Fig. 2 is a vertical section of the line 2—2 of Fig. 1, and

Figs. 3 and 4 are respectively sections on the lines 3—3 and 4—4 of Fig. 1.

Referring to the drawing, the invention is shown to comprise a shaft 6 on which is revolubly mounted a sleeve 7. A cam disk 8 is formed on this sleeve adjacent to the front end thereof. A driving pulley 9 is revolubly mounted on the sleeve 7 and is positioned thereon by a collar 10 coacting with the shoulder 11 on the rear face of the cam disk 8. This collar 10 is provided with the usual binder screw 12 to lock such collar upon the sleeve 7.

The pulley 9 is in the present embodiment provided with a peripheral groove 13 to receive a driving belt. The sleeve 7 is provided in its front face with a seat 14 to receive a block 15 adapted to be engaged by a pawl or other suitable form of clutch member on the driven shaft for normally operatively connecting the driving and driven elements. This clutch mechanism is not shown as it forms not part of the present invention.

The cam disk 8 is provided with a cut away portion 16 to form a curved peripheral shoulder 17 to fit the periphery of the cam roll 18. The cam roll 18 is mounted on the stud shaft 19 in the outer portion of the arm 20 of the bell crank 21 which is pivotally mounted on the stud shaft 22 seated in the pulley 9. The bell crank 21 is retained upon the shaft 22 by the washer 23 and the screw 24. The arm 25 of the bell crank 21 has its outer extremity connected by the spring 26 to the tension adjusting screw 27 seated in the peripheral portion of the pulley 9.

A catch 28 pivotally mounted on the face of the pulley at 29 is adapted to engage the outer extremity 30 of the arm 20 when this arm is forced outwardly by the action of the shoulder 17 on the roll 18, and to thus retain the arm in its outermost position until such catch is released. An arm 31 projects from the catch 28 and the outer extremity of this arm is connected by the controlling spring 32 with the face of the pulley 9.

An opening 33 through the pulley 9 opposite to the arm 31 is provided to permit the operator to insert his finger beneath such arm to release the bell crank 21 from the catch 28. An oil passage 34 extends through the hub of the pulley 9, and the sleeve 7 to permit proper lubrication of these parts. A shoulder 35 on the periphery of the cam 8 corresponding to the shoulder 17 is provided to similarly engage the roll 18 when the driving pulley is driven in the reverse direction.

The spring 26 is adapted to retain the roll 18 in its seat against either the shoulder 17 or the shoulder 35, depending upon the direction of rotation of the pulley, under all normal loads and thus cause the sleeve 7 to be driven by the pulley through the medium of the arm 20, the roll 18 and the cam disk 8. When the sleeve 7 meets with abnormal resistance in driving the driven shaft, the roll 18 will be forced outwardly by the curved face of the shoulder on the cam disk until the roll rests on the normal periphery of such disk, automatically releasing the driving action on the sleeve. The outward movement of the arm 20 under the action of the roll causes the extremity 30 of such arm to engage the opposing face of the catch 28, forcing such catch to swing on its pivot against the action of the spring 32 until this extremity enters the notch in the face of the catch as the roll leaves the cut away portion of the cam. The roll 18 is thus prevented from entering the cut away portion of the cam during succeeding revolutions of the pulley until the arm 20 is released from the catch in the manner described. When thus released, the roll is forced into the cut away portion of the cam by the spring 26 and the operation of the driven element resumed as soon as such roll engages the shoulder on the cam.

It will thus be seen that an effectual form of drive under normal loads is provided but that when abnormal resistance is encountered, the driven element will be automatically released from the driving element and will not again become operatively engaged until the operator disengages the catch in the releasing device. This is particularly advantageous in preventing damage to machines caused by stoppages and other conditions producing the abnormal resistance.

It will be apparent that various changes may be made in the form, construction and arrangement of the parts without departing from the spirit and scope of our invention or sacrificing any of the material advantages thereof and we reserve the right to make all such changes as fairly fall within the scope of the following claims:

We claim:

1. In a device of the class described, a shaft, a sleeve free on said shaft, a disk fixed on said sleeve and having its periphery indented to form a shoulder thereon, a driving pulley free on said sleeve, an arm projecting from said pulley and having its outer extremity contacting with the periphery of said disk, and a catch on said pulley engaging said arm when it is forced out of said indentation to retain said arm without said indentation in succeeding revolutions of said pulley.

2. In a device of the class described a driving element, a driven element having a circular periphery cut away to form opposed shoulders, an arm pivoted on said driving element, a spring forcing one end of said arm into contact with said cut away portion of said driven element to engage either shoulder and drive said driven element under a normal load, said spring being adapted to yield when an abnormal load comes on said driven element and permit said arm to ride off of the shoulder and over the circular periphery of said driven element.

3. In a device of the class described a driving element, a driven element having a circular periphery cut away to form opposed shoulders, an arm pivoted on said driving element, a spring forcing one end of said arm into contact with said cut away portion of said driven element to engage either shoulder and drive said driven element under a normal load, said spring being adapted to yield when an abnormal load comes on said driven element and permit said arm to ride off of the shoulder and over the circular periphery of said driven element, and a latch adapted to hold said arm against the engagement with said shoulder in successive revolutions.

4. In a device of the class described, a driving element, a driven element, a driving shoulder on said driven element, a bent lever pivoted on said driving element, a spring acting on one arm of said bent lever to force the other arm thereof yieldingly against said shoulder to effect a driving engagement, said spring being adapted to yield under a predetermined load to permit said lever to automatically disengage said driving element from said driven element and means to hold said lever in disengaged position.

5. In a device of the class described, a pulley, a bell crank lever pivoted to said pulley, a disk adjacent to the pulley having a driving shoulder, a roller carried by one arm of said bell crank lever adapted to engage said shoulder to drive said disk with said pulley, a spring connected with said pulley and the other arm of said bell crank lever, means for adjusting said spring to vary the force with which said roller engages said shoulder and a latch for holding said roller out of engagement with said shoulder.

JOSEPH S. DUNCAN.
HENRY E. HUBBARD.